United States Patent
Swales et al.

(10) Patent No.: US 9,156,348 B1
(45) Date of Patent: Oct. 13, 2015

(54) TWO AXIS ELECTRIC DRIVE

(71) Applicant: GM Global Technology Operations LLC, Detroit, MI (US)

(72) Inventors: Shawn H. Swales, Canton, MI (US); Scott Vaubel, Attica, MI (US); Gary R. Valler, Greenfield, IN (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/333,745

(22) Filed: Jul. 17, 2014

(51) Int. Cl.
*F16H 3/72* (2006.01)
*B60K 17/04* (2006.01)
*F16H 3/44* (2006.01)
*B60K 6/365* (2007.10)
*B60K 17/16* (2006.01)

(52) U.S. Cl.
CPC ............. *B60K 17/046* (2013.01); *B60K 6/365* (2013.01); *B60K 17/16* (2013.01); *F16H 3/44* (2013.01)

(58) Field of Classification Search
CPC .... B60K 17/046; B60K 6/365; B60K 17/043; B60K 17/16
USPC ...................................... 475/5; 74/606 R, 607
See application file for complete search history.

(56) References Cited

U.S. PATENT DOCUMENTS

| | | | | |
|---|---|---|---|---|
| 6,122,996 | A * | 9/2000 | Hauser et al. | 74/607 |
| 6,290,044 | B1 * | 9/2001 | Burgman et al. | 192/46 |
| 7,454,907 | B1 * | 11/2008 | Hauser et al. | 60/487 |
| 8,870,697 | B2 * | 10/2014 | Sada et al. | 475/149 |
| 2002/0019284 | A1 * | 2/2002 | Aikawa et al. | 475/150 |
| 2004/0166980 | A1 * | 8/2004 | Supina et al. | 475/5 |
| 2004/0251064 | A1 * | 12/2004 | Imai | 180/65.2 |
| 2011/0312460 | A1 * | 12/2011 | Nett et al. | 475/5 |
| 2013/0152570 | A1 * | 6/2013 | Hoshinoya et al. | 60/396 |
| 2013/0283972 | A1 * | 10/2013 | Yamamoto et al. | 74/665 B |
| 2014/0357441 | A1 * | 12/2014 | Supina | 475/5 |
| 2015/0045179 | A1 * | 2/2015 | Okuwaki | 477/5 |

* cited by examiner

*Primary Examiner* — David J Hlavka
(74) *Attorney, Agent, or Firm* — Harness, Dickey & Pierce, P.L.C.

(57) ABSTRACT

An electric drive for a vehicle includes an electric motor and a planetary gear assembly including a sun gear drivingly connected to a rotor of the electric motor. A ring gear of the planetary gear assembly is connected to a brake that can be released to provide the system with a disconnect. A first transfer gear is connected to the planetary carrier. A second transfer gear is drivingly engaged with the first transfer gear and rotatable about a second axis offset from an axis of the electric motor. A differential is drivingly connected to the second transfer gear and provides drive torque to a pair of drive shafts along the second axis.

20 Claims, 3 Drawing Sheets

TWO AXIS ELECTRIC DRIVE

FIELD

The present disclosure relates to an electric drive for a vehicle and more particularly, to a two axis electric drive for a vehicle.

BACKGROUND

This section provides background information related to the present disclosure which is not necessarily prior art.

Most automobiles in current use are driven by fuel engines, which experience a great deal of mechanical loss and have low energy efficiency, thereby consuming a lot of energy and causing environmental pollution. As battery technology has improved, the popularity of hybrid electric and electric vehicles has increased over the last several years. However, the packaging requirements for traditional electric motor drive systems has influenced the vehicle designs and efficiency. Accordingly, it is desirable to provide an electric drive that has a more compact arrangement and reduced weight to provide for improved efficiency.

SUMMARY

This section provides a general summary of the disclosure, and is not a comprehensive disclosure of its full scope or all of its features.

An electric drive for a vehicle is provided including an electric motor including a stator and a rotor rotatable about a first axis. A planetary gear assembly includes a sun gear drivingly connected to the rotor, a plurality of planetary gears in meshing engagement with the sun gear and supported by a planetary carrier. A ring gear is in meshing engagement with the plurality of planetary gears. A brake is connected to the ring gear. A first transfer gear is connected to the planetary carrier. A second transfer gear is drivingly engaged with the first transfer gear and rotatable about a second axis offset from the second axis. A differential is drivingly connected to the second transfer gear and provides drive torque to a pair of drive shafts.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
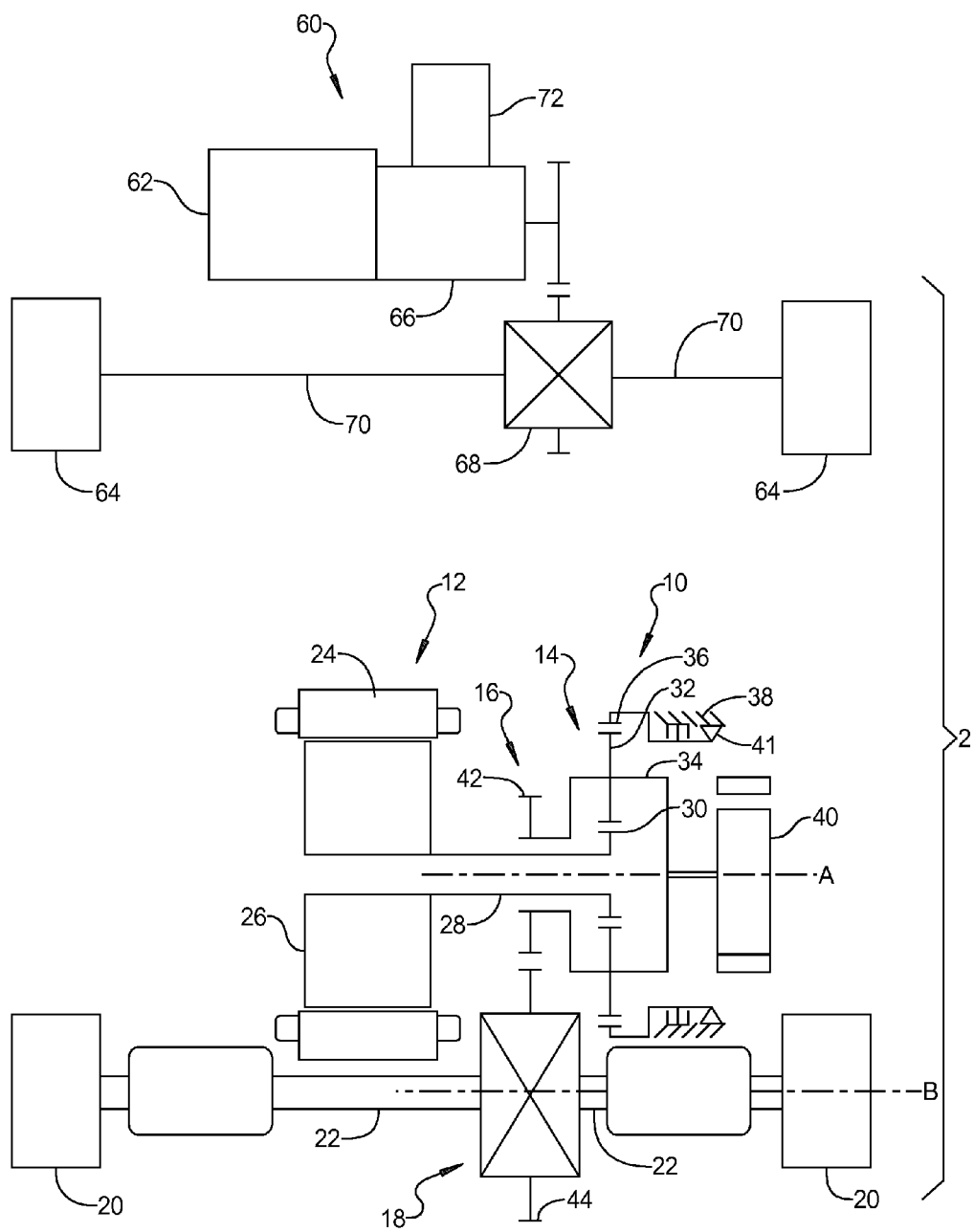
FIG. 1 is a schematic diagram of a hybrid electric vehicle having an electric drive for a vehicle according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a schematic diagram of a hybrid electric vehicle 2 having a two-axis electric drive 10 is shown. The two-axis electric drive 10 includes an electric motor 12 that provides drive torque to a planetary gear assembly 14 that provides drive torque to a transfer gear mechanism 16 that provides drive torque to a differential 18 the provides drive torque to a pair of drive wheels 20 through left and right half shafts 22.

The electric motor 12 can include a stator 24 and a rotor 26 that is rotatable about a first axis A. A motor output shaft 28 can be connected to the rotor 26. The planetary gear assembly 14 can include a sun gear 30 drivingly connected to the motor output shaft 28. A plurality of planetary gears 32 that are supported by a planetary carrier 34 are in meshing engagement with the sun gear 30. A ring gear 36 is in meshing engagement with each of the planetary gears 32. A brake 38 is connected to the ring gear 36. The brake 38 can be a normally applied spring brake and can be hydraulically released by a pressurized oil from an oil pump 40 (shown as a gerotor-type pump) that is driven by the planetary carrier 34. A one-way clutch 41 is provided for allowing the ring gear to be fully braked during electric driving to allow for the use of a smaller plate brake 38. The planetary carrier 34 is also connected to a first transfer gear 42 of the transfer gear mechanism 16. The first transfer gear 42 is meshing only engaged with a second transfer gear 44 that is rotatable about a second axis B. The second transfer gear 44 is drivingly connected to the differential 18 that provides drive torque to the left and right half shafts 22. The left and right half shafts 22 can each provide drive torque to the pair of drive wheels 20 through constant velocity joints.

Figure 2:
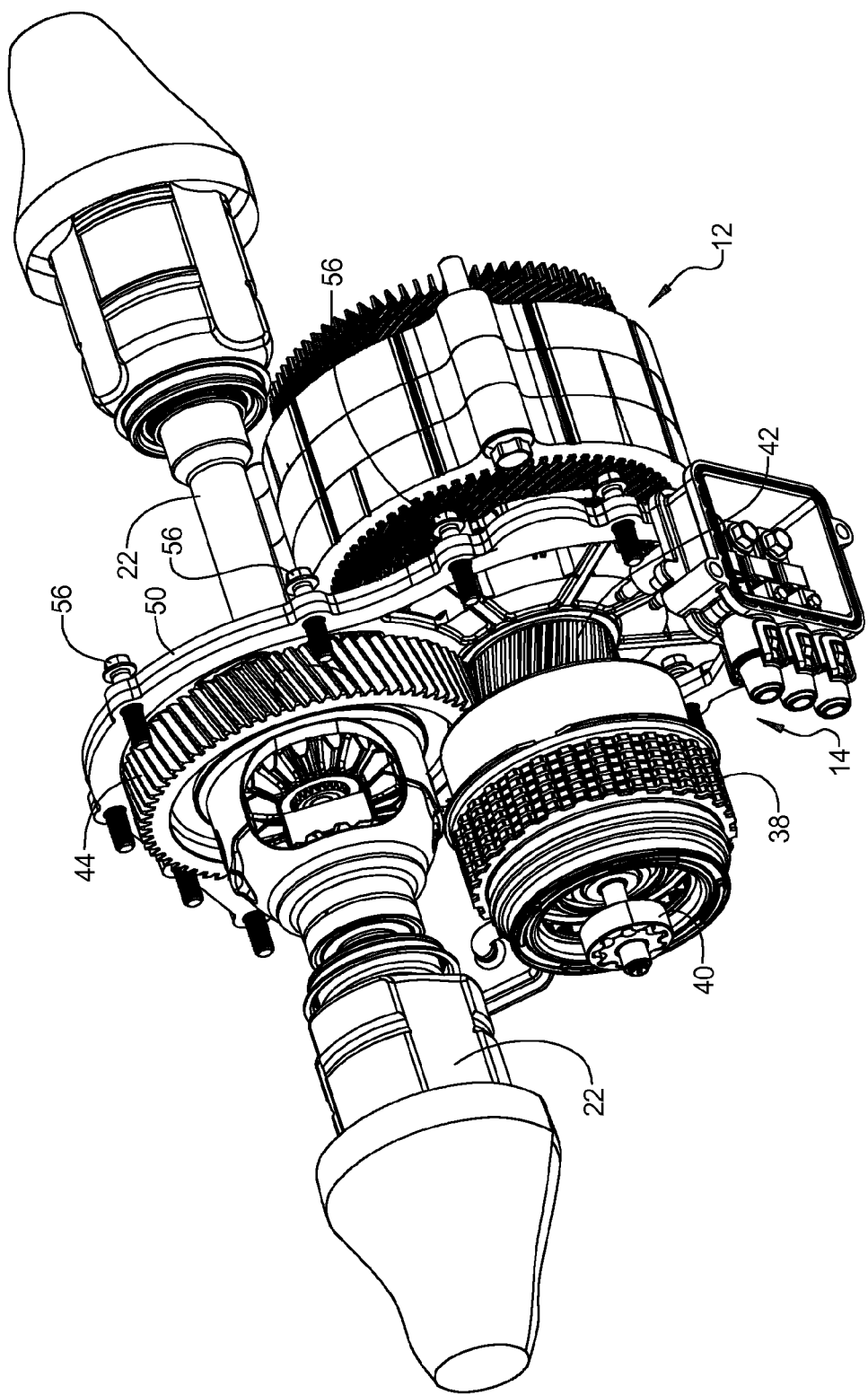
FIG. 2 is a perspective view of the electric drive shown in FIG. 1 with the housing removed for illustration purposes.
Figure 3:
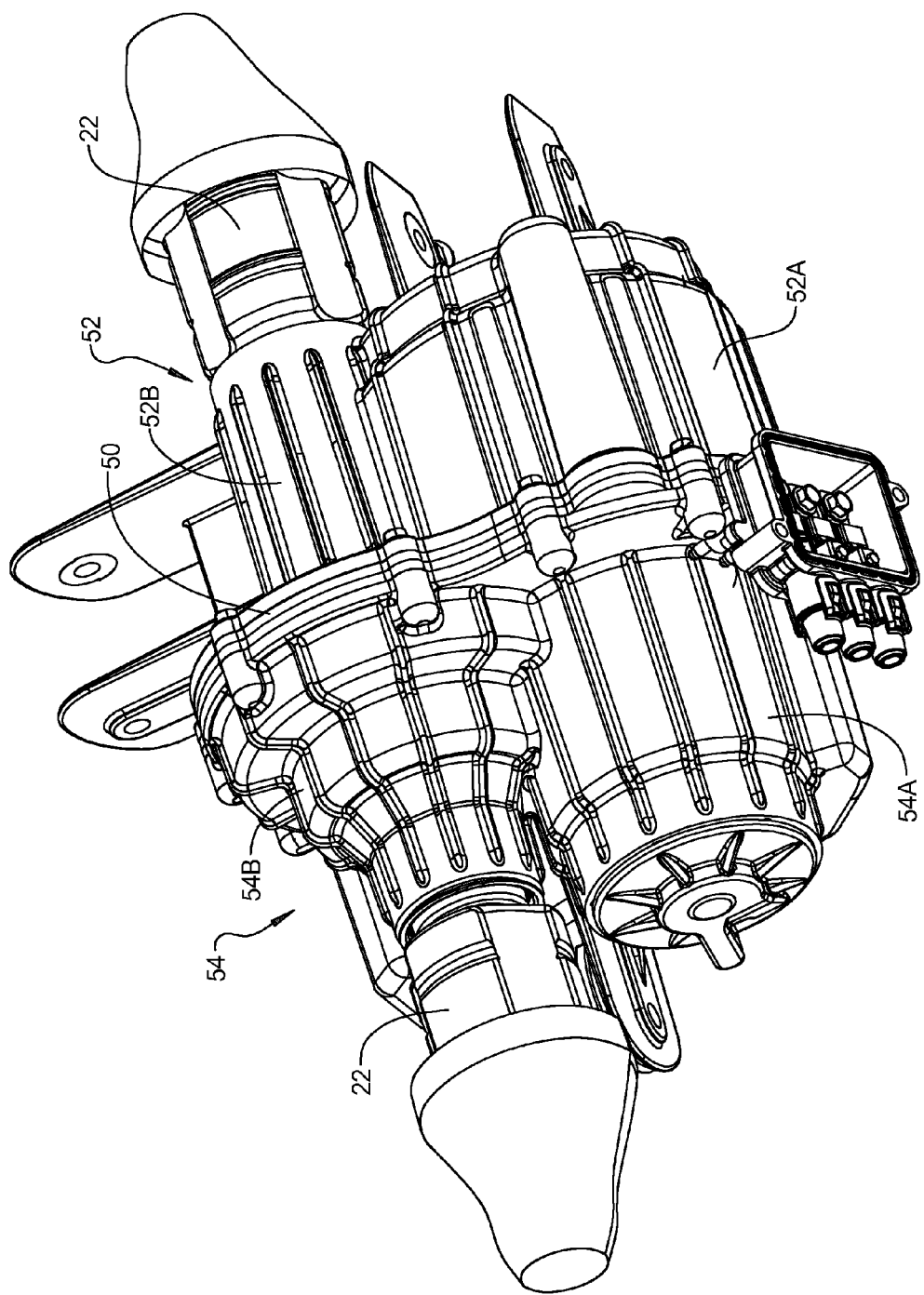
FIG. 3 is a perspective view of the electric drive housing according to the principles of the present disclosure.

With reference to FIG. 2, the two-axis electric drive 10 includes a center support 50 adjacent to the first transfer gear 42 and second transfer gear 44. The center support 50 receives the motor output shaft 28 and the right-hand half shaft 22 therethrough. Support bearings for the various shafts passing through the bearing plate are arranged such that they lie substantially within the plane of the center support 50, thereby providing a naturally rigid mounting and accurate positional tolerance among the various bearings. With reference to FIG. 3, the two-axis electric drive 10 is shown with a first housing section 52 attached to one side of the center support 50 and a second housing section 54 attached to a second side of the bearing plate 50. The center support 50 and first and second housing sections 52, 54 are each provided with mounting apertures that receive fasteners 56 therethrough for securing each of the housing sections 52, 54 to the center support 50. The fasteners 56 can include alignment features such as dowels. The first housing section 52 includes a motor housing portion 52A and a shaft housing portion 52B. The second housing section 54 includes a planetary gear housing portion 54A and a differential housing portion 54B. The pair of half shafts 22 each extend outward from the first and second housing sections 52, 54.

The electric drive 10 uses a planetary gear assembly 14 as a primary reduction including the ring brake 36 to act as a disconnect and utilizes the transfer gear mechanism 16 as a two-axis secondary reduction. The arrangement enables a high motor to axle ratio with only two axes, without passing the axle shaft through the motor, thereby allowing the size of the motor and its bearings to be minimized. The design of the present disclosure further minimizes the mass of the drive unit in this ratio range. The present system also retains the ability to implement a disconnect as a ring brake, which is simpler to mechanize than a rotating clutch as used in conventional designs. The present system provides a physically compact arrangement having no third axis and allows the oil pump 40 to be directly driven while not stacking all elements along a single axis.

The planetary gear ratio and transfer gear mechanism ratio enables a total gear ratio of up to, for example, 10-12:1. The system utilizes the one-way clutch 41 that is provided to permit launch with a smaller plate clutch. The transfer gear mechanism 16 is positioned axially between the motor 12 and the planetary gear assembly 14 which centralizes the differential 18.

It should be understood that alternative differential mechanisms can be utilized including a planetary gear differential. In addition, alternative brake arrangements can be provided including a dog brake, selectable one-way clutch brake, or other type of braking mechanism.

As shown in FIG. 1, the two-axis electric drive 10 can be utilized in a hybrid electric vehicle 2 that includes a powertrain 60 having an internal combustion engine 62 that drives a pair of drive wheels 64 via a transmission 66, differential 68 and a pair of drive shafts 70. The powertrain 60 can optionally include a motor generator 72 that assists in driving the drive wheels 64. It should be understood that the powertrain 60 can have various arrangements. The disconnect brake 38 on the ring gear 36 of the planetary gear assembly 14 allows the electric drive 10 to be disconnected from the drive wheels 20 when the powertrain 60 is driving the vehicle 2 at high speeds.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive for a vehicle, comprising:
   an electric motor including a stator and a rotor rotatable about a first axis;
   a planetary gear assembly including a sun gear drivingly connected to the rotor, a plurality of planetary gears in meshing engagement with the sun gear and supported by a planetary carrier, a ring gear in meshing engagement with the plurality of planetary gears;
   a brake is connected to the ring gear;
   a first transfer gear is connected to the planetary carrier;
   a second transfer gear is directly driven by the first transfer gear and rotatable about a second axis offset from the first axis; and
   a differential is directly driven by the second transfer gear and provides drive torque to a pair of drive shafts rotatable about said second axis.

2. The electric drive according to claim 1, wherein the first transfer gear is disposed between the planetary gear assembly and the motor.

3. The electric drive according to claim 1, further comprising an oil pump driven by the planetary carrier, the oil pump supplying pressurized oil to the brake.

4. The electric drive according to claim 3, wherein the oil pump selectively supplies pressurized oil to disengage the brake.

5. The electric drive according to claim 4, wherein the brake includes a spring for applying the brake and is hydraulically released by the pressurized oil from the oil pump.

6. The electric drive according to claim 1, further comprising a center support adjacent to the first transfer gear and the second transfer gear.

7. The electric drive according to claim 6, wherein the center support is disposed between the electric motor and the first transfer gear.

8. The electric drive according to claim 6, further comprising a first housing section attached to the center support and covering the electric motor.

9. The electric drive according to claim 8, further comprising a second housing section attached to the center support and covering the planetary gear assembly and the differential.

10. An electric drive for a vehicle, comprising:
- an electric motor including a stator and a rotor rotatable about a first axis;
- a planetary gear assembly including a sun gear drivingly connected to the rotor, a plurality of planetary gears in meshing engagement with the sun gear and supported by a planetary carrier, a ring gear in meshing engagement with the plurality of planetary gears;
- a brake is connected to the ring gear;
- a first transfer gear is connected to the planetary carrier;
- a second transfer gear is drivingly engaged with the first transfer gear and rotatable about a second axis offset from the first axis;
- a differential is drivingly connected to the second transfer gear and provides drive torque to a pair of drive shafts;
- a center support adjacent to the first transfer gear and the second transfer clear;
- a first housing section attached to the center support and covering the electric motor;
- a second housing section attached to the center support and covering the planetary gear assembly and the differential; and
- further comprising an oil pump driven by the planetary carrier and disposed in the second housing section.

11. The electric drive according to claim 9, wherein the center support supports a plurality of bearings within a plane of the center support.

12. The electric drive according to claim 1, further comprising a one-way clutch connected to the ring gear.

13. The electric drive according to claim 12, wherein the one-way clutch is a selectable one-way clutch.

14. A hybrid electric vehicle, comprising;
- an internal combustion engine drivingly connected to a first pair of drive shafts; and
- an electric drive, including;
- an electric motor including a stator and a rotor rotatable about a first axis;
- a planetary gear assembly including a sun gear drivingly connected to the rotor, a plurality of planetary gears in meshing engagement with the sun gear and supported by a planetary carrier, a ring gear in meshing engagement with the plurality of planetary gears;
- a brake is connected to the ring gear;
- a first transfer gear is connected to the planetary carrier;
- a second transfer gear is directly driven by the first transfer gear and rotatable about a second axis offset from the first axis; and
- a differential is directly driven by the second transfer gear and provides drive torque to a second pair of drive shafts rotatable about said second axis.

15. The electric drive according to claim 14, wherein the first transfer gear is disposed between the planetary gear assembly and the motor.

16. The electric drive according to claim 14, further comprising an oil pump driven by the planetary carrier, the oil pump supplying pressurized oil to the brake.

17. The electric drive according to claim 14, wherein the first transfer gear is smaller than the second transfer gear.

18. The electric drive according to claim 14, further comprising a bearing plate adjacent to the first transfer gear and the second transfer gear.

19. The electric drive according to claim 18, further comprising a first housing section attached to the bearing plate and covering the electric motor and a second housing section attached to the bearing plate and covering the planetary gear assembly and the differential.

20. The electric drive according to claim 14, further comprising a one-way clutch connected to the ring gear.

* * * * *